United States Patent [19]

Smith

[11] Patent Number: 4,741,402
[45] Date of Patent: May 3, 1988

[54] SUBSEA HYDRAULIC CONNECTOR WITH MULTIPLE PORTS

[75] Inventor: John D. Smith, Houston, Tex.
[73] Assignee: Hughes Tool Company, Houston, Tex.
[21] Appl. No.: 918,753
[22] Filed: Oct. 14, 1986
[51] Int. Cl.⁴ .................. F16L 35/00; E21B 33/035
[52] U.S. Cl. .................................. 166/344; 285/26; 285/131; 166/368
[58] Field of Search ............... 166/338, 351, 339, 365, 166/344, 347; 285/26, 28, 29, 131, 132, 101, 108, 137.1, 137.2, 314; 277/102, 113

[56] References Cited

U.S. PATENT DOCUMENTS

| | | | |
|---|---|---|---|
| 3,966,235 | 6/1976 | Lewis | 285/28 |
| 4,219,223 | 8/1980 | Schulte | 285/26 |
| 4,328,826 | 5/1982 | Baugh | 137/236 |
| 4,378,123 | 3/1983 | Largent et al. | 285/108 |
| 4,411,454 | 10/1983 | Nayler et al. | 285/26 |
| 4,457,489 | 7/1984 | Gilmore | 251/148 |
| 4,460,156 | 7/1984 | Hazelrigg et al. | 166/344 |
| 4,589,689 | 5/1986 | Regan | 285/24 |
| 4,592,426 | 6/1986 | Neely | 166/347 |

Primary Examiner—Stephen J. Novosad
Assistant Examiner—Bruce M. Kisliuk
Attorney, Agent, or Firm—James E. Bradley

[57] ABSTRACT

A subsea hydraulic coupling has a pair of vertically spaced apart receptacles, each mounted to a different subsea well subassembly. A connector is lowered from the surface into engagement with the receptacles. The receptacles have radial ports. The connector has radial pistons that mate with the ports. Each piston has a flow passage extending through it. A communication passage extends from the flow passage of each piston through the body of the connector to a source of hydraulic fluid pressure. The connector body has a bore with a cam located inside. The cam, when actuated by hydraulic fluid pressure, pushes the pistons outwardly to engage the receptacle ports.

5 Claims, 2 Drawing Sheets

SUBSEA HYDRAULIC CONNECTOR WITH MULTIPLE PORTS

BACKGROUND OF THE INVENTION

1. Field of the Invention:

This invention relates in general to hydraulic connectors for subsea wells, and in particular to a hydraulic connector that will make multiple hydraulic fluid connections in at least two different receptacles spaced vertically apart.

2. Description of the Prior Art:

In a subsea well installation, hydraulic fluid pressure is delivered from the surface to various sub assemblies for remotely controlling the well. For a well being drilled, the hydraulic fluid pressure is required for controls on such mechanical subassemblies such as the lower riser package, the blowout preventer stack, and the choke and kill lines. Normally, each subassembly will have its own hydraulic fluid supply.

Connections are used at the subsea well to connect and disconnect the hydraulic lines supplying the fluid pressure. Normally, there will be some type of receptacle and a connector or mandrel which mates in the receptacle to make the hydraulic fluid connection. The connector must be able to latch into the receptacle. Also, it must be retrievable for maintenance and other purposes.

Improvements in subsea connections are desirable. Particularly, it would be desirable to use a single connection to make multiple hydraulic fluid connections between different mechanical subassemblies in the subsea environment.

SUMMARY OF THE INVENTION

The subsea hydraulic connector of this invention includes at least two annular receptacles, each of which has a sidewall and an axial bore. Each receptacle is mounted to a separate subsea assembly and positioned so that one receptacle is located a few inches above the other and in axial alignment. Each receptacle has a plurality of radial ports or passages that extend through the sidewall.

A single mandrel or connector is lowered into the aligned receptacles. The connector also has a bore and a plurality of radial passages located in two vertically spaced apart sets. A piston is located in each of the connector radial passages. Each piston has a flow passage that leads from its outer end to its sidewall. The flow passage connects with a communication passage that extends through the sidewall of the connector.

A pair of cams are located in the bore of the connector, each cam positioned inwardly of one of the sets of pistons. When the cams are actuated, they push the pistons out to seal against the receptacle ports. The cams are actuated by hydraulic fluid pressure. Each cam has a retracting ring on its lower end which will retract the pistons when the cam is pulled upwardly. The cams can be pulled upwardly by a mechanical rod or hydraulically.

DESCRIPTION OF THE PREFERRED EMBODIMENT

Figure 1:
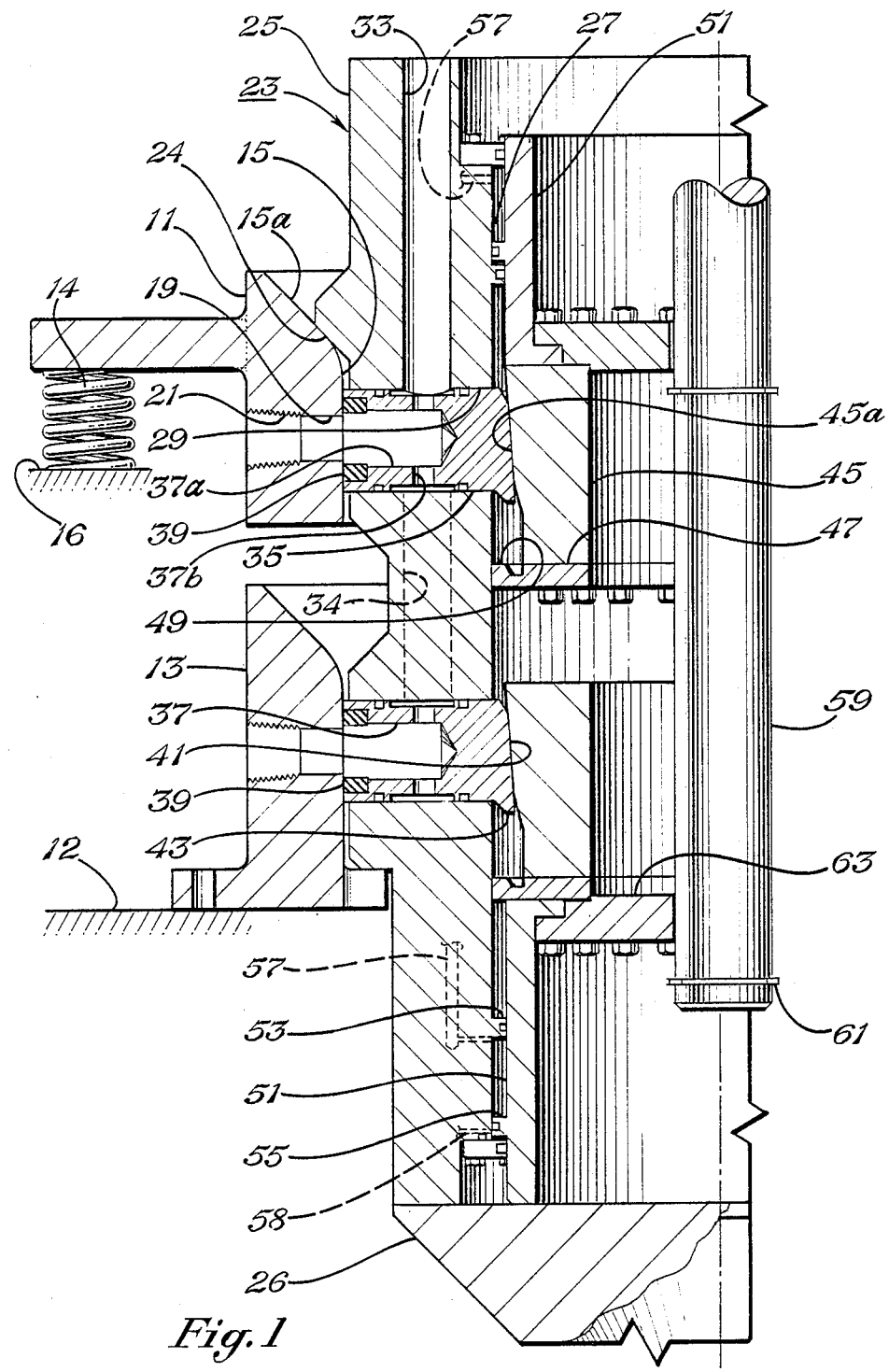
FIG. 1 is a vertical sectional view of a subsea hydraulic fluid coupling constructed in accordance with this invention.

Referring to FIG. 1, the subsea coupling includes upper and lower receptacles 11 and 13 which are spaced vertically apart. Each receptacle 11 and 13 will be mounted to a different subsea component and will have been lowered into the sea at different times. In one application, lower receptacle 13 is rigidly mounted to a subsea blowout preventer 12, and is used for providing hydraulic fluid to such equipment as the blowout preventer rams, the blowout preventer connector, and to choke and kill valves (not shown).

In the same application, the upper receptacle 11 is mounted to the riser connector 16, normally by springs 14. The riser connector 16 is on the lower end of a string of riser conduit (not shown) and is lowered into the sea for connection to the blowout preventor 12. The upper receptacle 11 is used for supplying hydraulic fluid to lock and unlock the riser connector 16. When the riser connector 16 is lowered in place, the upper receptacle 11 will be vertically aligned with the lower receptacle 13.

Each receptacle 11, 13 has an axial bore 15 of the same diameter and which is coaxial when the receptacles are landed in position. Each bore 15 has an upper landing shoulder 15a that is conical. Each receptacle 11, 13 has a plurality of radially oriented ports 19 extending around it. The ports 19 in the upper receptacle 11 are all located in the same horizontal plane, which is spaced apart from the horizontal plane containing all the ports 19 in the lower receptacle 13. Each port 19 has threads 21 which serve as connection means for supplying hydraulic fluid to the various subassemblies in the subsea well environment previously described.

A mandrel or connector 23 is adapted to be lowered on a line (not shown) from the surface and received within the receptacles 11 and 13 for supplying hydraulic fluid to the various ports 19. Connector 23 has a connector body 25 which has an external landing shoulder 24 for landing on the landing shoulder 15a of the upper receptacle 11. A portion of the sidewall of the connector body 25 is received closely within each receptacle bore 15. The connector body 25 also has a nose 26 on its lower end to facilitate the entry of the connector body 25 into the bores 15.

Connector body 25 has an axial bore 27 that is coaxial with the bores 15 when landed. Connector body 25 also has a plurality of upper and lower piston passages 29. The upper piston passages 29 are radially oriented and adapted to align with ports 19 in the upper receptacle 11. The lower piston passages 29 are radially oriented and adapted to align with the ports 19 in the lower receptacle 13.

A plurality of separate communication passages 33 (only one shown) extend vertically downward through the sidewall of the connector 23, intersecting each of the upper piston passages 29. Similarly, a plurality of separate communication passages 34 (only one shown) extend through the sidewall of the connector 23, intersecting each of the lower piston passages 29. The communication passages 33 and 34 are connected to manifold and control means (not shown) at the top of connector 23 for supplying hydraulic fluid pressure selectively to the various passages 29.

A piston 35 is reciprocally carried in each of the passages 29. Each piston 35 has a flow passage 37 contained within it. The flow passage 37 has a radial portion 37a that extends from the face or outer end of the piston 35 inwardly a selected distance. The flow passage 37 has a vertical portion 37b that extends from the inner end of the radial portion 37a vertically upward to the sidewall of the piston 35. The flow passage 37 communicates hydraulic fluid pressure from the communication passages 33 and 34 to the receptacle ports 19.

A seal 39 is located on the face of each piston 35. Each piston 35 also has an inclined inner end 41 that protrudes inwardly into the bore 27 of the connector 23. The inclined inner end 41 of each piston 35 terminates with a depending lower lip 43. The length of each piston 35 is greater than the length of the piston passages 29, so that when the inclined end 41 is pushed outwardly, the face of the piston 35 will protrude outwardly and seal against the receptacles 11 or 13.

A cam 45 is located adjacent each set of pistons 35 for moving the pistons 35 between the inner and outer pisitions. Each cam 45 is an annular member having an inclined surface 45a on its exterior that mates with the inclined ends 41 of the pistons 35. Each cam 45 has an extraction plate 47 mounted below its inclined surface 45a. Extraction plate 47 has an upwardly facing lip 49 that is positioned to engage the piston lip 43 to retract the pistons 35. Each cam 45 is independently movable of the other.

Each cam 45 is moved downwardly by a separate piston 51. The piston 51 on the lower cam 45 is located on the lower end of the cam 45. The piston 51 for the upper cam 45 is located on the upper end of the cam 45. Each piston 51 functions the same. An annular shoulder 53 is located in the connector bore 27 adjacent each piston 51. Also, each piston 51 has a shoulder 55 that sealingly engages the connector bore 27. This results in a hydraulic fluid chamber between the shoulders 53 and 55. Actuating fluid passages 57 lead to this chamber for supplying fluid to separate the shoulders 53 and 55 to move the pistons 51 downwardly. A return flow passage 58 is located on the opposite side of each shoulder 55. To move cams 45 upward, the return flow passages 58 are supplied with hydraulic fluid pressure. The cams 45 are not mechanically connected together. Even if both pistons 51 are supplied with hydraulic fluid at the same time, the cams 45 move independently of each other. It is possible that one cam 45 may move downward farther than the other due to tolerances and the alignment of the receptacles 11 and 13.

In addition to the hydraulic system for releasing the cams 45, a mechanical release system is employed in case the hydraulic system is unable to cause the cams 45 to move upward. The mechanical release system includes a release rod 59 that is carried on the axis of the connector bore 27. Release rod 59 has a pair of shoulders 61 which are positioned below release plates 63 mounted to the interior of each cam 45.

A latch (not shown) is lowered from the surface to engage the upper end (not shown) of the release rod 59. When it is pulled upwardly, the shoulders 61 will contact the release plates 63 to move the cams 45 to the upper position. The shoulder 61 on the lower end of rod 59 is farther from the lower release plate 63 than the distance from the upper shoulder 61 to the upper release plate 63. As a result, the upper cam 45 will be released before the lower cam 45 is pulled upward.

Figure 2:
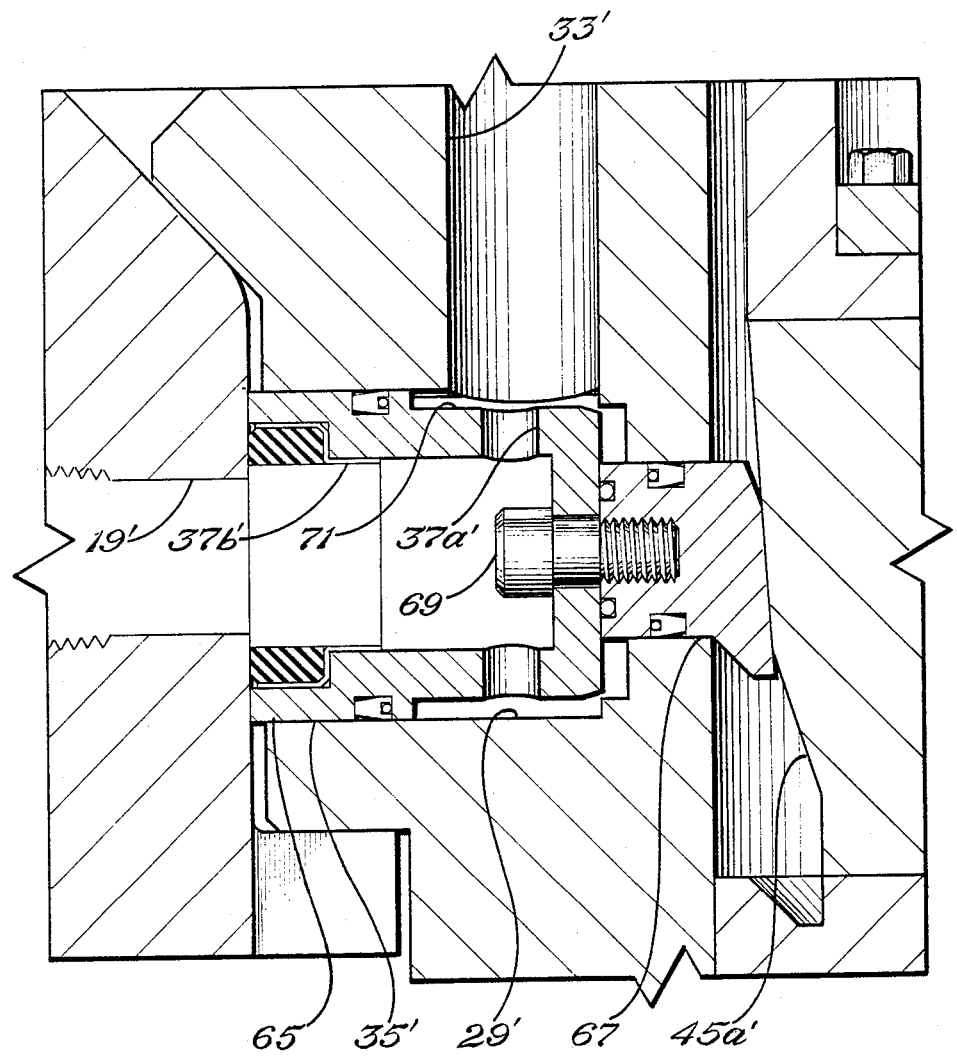
FIG. 2 is an enlarged view of a portion of the coupling of FIG. 1, shown with an alternate type of piston.

An alternate embodiment is shown in FIG. 2, with prime symbols used to indicate components that are uncommon with the embodiment in FIG. 1. In the alternate embodiment, the radial pistons 35' differ from the radial pistons 35 of FIG. 1. In the embodiment of FIG. 2, the fluid pressure in the communication passage 33' also applies an outward force on the radial pistons 35' to more tightly seal the radial pistons 35' against the ports 19'.

The piston 35' has an outer end portion 65 and an inner end portion 67 that is of smaller diameter. The piston passage 29' is also of a smaller diameter than the portion that receives the inner end 67. The inner end 67 is in the embodiment shown a separate component that is secured by a screw 69 to the piston 35'. The piston 35' also has a recess portion 71 around its sidewall. Pressure in the communication passage 33 will cause a net outward force on the piston 35 due to the larger pressure area on the outer portion 65 than on the inner portion 67.

In operation, the lower receptacle 13 will be mounted to a subassembly such as the blowout preventer stack 12 and lowered onto the subsea well. The upper receptacle 11 will be mounted to a subassembly such the riser connector 16 and lowered into position in vertical alignment with the receptacle 13. The various ports 19 of lower receptacle 13 typically will be connected to one mechanical subassembly, such as a blowout preventer stack and choke and kill valves. The various ports 19 of the upper receptacle 11 will typically be connected to another subassembly such as a lower riser package.

The connector 23 is lowered on guide lines (not shown) into the receptacles 11 and 13. Once landed, hydraulic fluid pressure is supplied to the actuating fluid passages 57. The hydraulic fluid pressure acts on the shoulders 53 and 55 to move the pistons 51 downwardly. This causes the cams 45 to move downwardly, pushing the radial pistons 35 outwardly. The seals 39 will seal against the bores 15 of the receptacles 11 and 13. Hydraulic fluid pressure will then be supplied to flow through the communication passages 33 and 34, flow passages 37 and ports 19 to the mechanical subassemblies.

When it is desired to release the connection, the hydraulic fluid pressure can be delivered to the return flow passages 58 to move each cam 45 upwardly. Also, a latch can be employed to pull the rod 59 upwardly. The lips 49 of the retracting plates 47 will contact the piston lips 43, causing the pistons 35 to move inwardly out of sealing engagement with the receptacles 11 and 13. The connector 23 can then be pulled to the surface.

The invention has significant advantages. A single connector simultaneously will connect multiple ports for use in various subsea subassemblies. The pistons positively engage the receptacles to avoid the possibility of leakage. The pistons can be retracted hydraulically or mechanically.

While the invention has been shown in only two of its forms, it should be apparent to those skilled in the art that it is not so limited, but is susceptible to various changes without departing from the scope of the invention.

I claim:

1. An improved subsea hydraulic connector, comprising in combination:
    an annular member, having a sidewall and an axial bore, adapted to be mounted to a subsea subassembly;
    a plurality of radial ports extending through the sidewall of the annular member;

a connector adapted to be lowered into engagement with the annular member, the connector having a sidewall;

a plurality of radially oriented piston passage extending to the connector sidewall and positioned for alignment with the radial ports of the receptacle;

communication passage means extending through the connector and intersecting the piston passages for supplying hydraulic fluid to the piston passages;

a plurality of pistons, each reciprocally carried in one of the piston passages, each piston having an open end, a closed end, and a cylindrical sidewall slidingly engaging one of the piston passages;

a flow passage in each piston extending from the open end to a sidewall port in the piston sidewall in communication with the communication passage means; and cam means carried by the connector including a cam for moving each piston into sealing engagement with each radial port of the annular member, to supply hydraulic fluid from the communication passage means through the sidewall port, the piston flow passage and the radial port to other subsea equipment.

2. An improved subsea hydraulic connector, comprising in combination:

a pair of annular receptacles, each having a sidewall and an axial bore, each receptacle adapted to be mounted to a separate subassembly and lowered onto a subsea well in vertical alignment with each other;

a set of radial ports extending through the sidewall of each receptacle, each set being vertically spaced apart from the other when the receptacles are located in place at the subsea well;

a connector adapted to be lowered into the receptacle axial bore, the connector having a sidewall and an axial bore;

at least two sets of radial piston passages extending through the connector sidewall, each set positioned vertically apart for alignment with one of the sets of the receptacle radial ports;

communication passage means extending through the connector sidewall and intersecting the piston passages for supplying hydraulic fluid to the piston passages;

a plurality of pistons carried in the piston passages, each piston having an open outer end, a closed inner end, a cylindrical sidewall slidingly engaging one end of the piston passages, and an inner end protruding into the connector axial bore;

a flow passage in each piston extending axially from the outer end to a sidewall port in the piston sidewall in communication with the communication passage means; and cam means carried in the connector axial bore, having an annular cam in contact with the inner end of each piston, for moving each piston outwardly to push the outer end into sealing engagement with each radial port, to supply hydraulic fluid from the communication passage means through the sidewall port, the flow passage and radial port to other subsea equipment.

3. An improved subsea hydraulic connector, comprising in combination:

upper and lower annular receptacles, each having a sidewall and an axial bore, each receptacle adapted to be mounted to a separate subassembly and lowered onto a subsea well assembly in vertical alignment with each other;

a plurality of radial ports extending through the sidewall of each receptacle;

a connector adapted to be lowered from the surface into the receptacle axial bores, the connector having a sidewall and an axial bore;

upper and lower sets of vertically spaced apart radial piston passages extending through the connector sidewall, one of the sets positioned for alignment with the radial ports in the upper receptacle, and the other of the sets positioned for alignment with the radial ports in the lower receptacle;

communication passage means extending through the connector sidewall and intersecting the piston passages for supplying hydraulic fluid to the piston passages;

a plurality of pistons carried in the piston passages, each piston having a face on an outer end, a cylindrical sidewall slidingly engaging one of the piston passages, and an inner end protruding into the connector axial bore;

a flow passage in each piston extending from the face to the piston sidewall in communication with the communication passage means;

a seal located on the face of each piston surrounding the flow passage;

upper and lower vertically spaced annular cams reciprocally carried in the connector axial bore, the upper cam being in contact with the inner end of each piston located in the upper set of piston passages, and the lower cam being in contact with the inner end of each piston located in the lower set of piston passages, each cam being movable independently of the other cam from an upper position in which each piston is pushed outwardly with the face in sealing engagement with one of the radial ports to supply hydraulic fluid from the communication passage means through the piston passage, the flow passage and radial port to other subsea equipment;

a separate piston means for each cam located in the connector axial bore for moving each cam to the lower position; and actuating passage means extending to each piston means for supplying hydraulic fluid under pressure to cause each piston means to move each cam to the lower position; and release means for moving the cams back to the upper position and for retracting the pistons, to enable the connector to be retrieved from the receptacle.

4. An improved subsea hydraulic connector, comprising in combination;

upper and lower annular receptacles, each having a sidewall and an axial bore, each receptacle adapted to be mounted on a separate subassembly and lowered onto a subsea well assembly in vertical alignment with each other;

a plurality of radial ports extending through the sidewall of each receptacle;

a connector adapted to be lowered into the receptacle axial bore, the connector having a sidewall and an axial bore;

upper and lower sets of vertically spaced apart radial piston passages extending through the connector sidewall and positioned respectively for alignment with the radial ports of the upper and lower receptacles;

communication passage means extending through the connector sidewall and intersecting the piston passages for supplying hydraulic fluid to the piston passages;

a plurality of pistons carried in the piston passages, each piston having an outer end, a cylindrical sidewall slidingly engaging one of the piston passages, and an inner end protruding into the connector axial bore, the inner end having an inclined cam surface and a depending lip;

a flow passage in each piston extending from the outer end to the piston sidewall in communication with the communication passage means;

upper and lower annular cams reciprocally carried in the connector axial bore, for engaging respectively the pistons in the upper and lower sets of piston passages, each cam having an inclined outer surface in contact with the cam surface of the pistons, the cams being movable from an upper position in which each piston is retracted inwardly to a lower position in which each piston is pushed outwardly with the outer end in sealing engagement with one of the radial ports to supply hydraulic fluid from the communication passage means through the piston passage, the flow passage and radial port to other subsea equipment;

an extraction plate mounted to each cam below the inclined surface, having an upwardly facing lip for engaging the lip of the piston to pull it inwardly when the cam is in the upper position;

piston means for moving the cams to the lower position; and a release rod carried in the axial bore of the connector, having vertically spaced apart upper and lower shoulders for engaging a lower side of the upper and lower cams, respectively, the rod being reciprocally movable from a lower position to an upper position, forcing the cams upward to the upper position and retracting the pistons with the retraction plates.

5. An improved subsea hydraulic connector, comprising in combination:

a pair of annular receptacles adapted to be stationarily located at a subsea well, each having a sidewall and an axial bore, each receptacle adapted to be mounted to a separate subassembly and lowered onto a subsea well assembly in vertical alignment with each other;

a plurality of radial ports extending through the sidewall of each receptacle;

a connector adapted to be lowered from the surface into the receptacle axial bore, the connector having a sidewall and an axial bore;

a plurality of radial piston passages extending to the exterior of the connector sidewall and positioned for alignment with the radial ports;

communication passage means extending through the connector and intersecting the piston passages for supplying hydraulic fluid to the piston passages;

a plurality of pistons carried in the piston passages, each piston having a face on an outer end, a cylindrical sidewall slidingly engaging one of the piston passages, and an inner end;

a flow passage in each piston extending from the face to the piston sidewall in communication with the communication passage means; and cam means carried in the connector axial bore in contact with the inner end of each piston, for moving each piston outwardly to push the outer end into sealing engagement with each radial port, to supply hydraulic fluid from the communication passage means through the piston passage, the flow passage and radial port to other subsea equipment;

the inner end of each piston having a smaller outer diameter than the outer diameter of the outer end of each piston and having a smaller pressure area than the pressure area of the outer end of each piston, to urge each piston outwardly when hydraulic fluid pressure is supplied to the communication passage means and to the flow passage.

* * * * *